United States Patent
Wake et al.

(10) Patent No.: US 7,816,884 B2
(45) Date of Patent: *Oct. 19, 2010

(54) FUEL CELL SYSTEM AND METHOD OF STARTING OPERATION OF FUEL CELL SYSTEM HAVING AN ENERGY STORAGE BY REDUCING AN AMOUNT OF ELECTRICAL ENERGY IN THE ENERGY STORAGE PRIOR TO STARTING POWER GENERATION

(75) Inventors: Chihiro Wake, Saitama (JP); Jumpei Ogawa, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 169 days.

This patent is subject to a terminal disclaimer.

(21) Appl. No.: 12/125,668

(22) Filed: May 22, 2008

(65) Prior Publication Data
US 2008/0290832 A1 Nov. 27, 2008

(30) Foreign Application Priority Data
May 22, 2007 (JP) .............................. 2007-135595

(51) Int. Cl.
*H01M 8/04* (2006.01)
(52) U.S. Cl. .......................... 320/101; 429/22; 429/23; 429/24
(58) Field of Classification Search ................... 429/23, 429/24; 320/101
See application file for complete search history.

(56) References Cited

U.S. PATENT DOCUMENTS

| | | | |
|---|---|---|---|
| 6,612,385 B1 * | 9/2003 | Stuhler et al. | 180/65.31 |
| 7,078,116 B2 | 7/2006 | Enjoji et al. | |
| 7,309,538 B2 | 12/2007 | Shiraishi et al. | |
| 7,436,148 B2 | 10/2008 | Saeki et al. | |
| 2004/0076860 A1 * | 4/2004 | Aso | 429/23 |

(Continued)

FOREIGN PATENT DOCUMENTS

JP 2003-197240 7/2003

(Continued)

OTHER PUBLICATIONS

Japanese Office Action for Application No. 2007-135595, dated Aug. 11, 2009.

(Continued)

*Primary Examiner*—Edward Tso
*Assistant Examiner*—Manuel Hernandez
(74) *Attorney, Agent, or Firm*—Lahive & Cockfield, LLP; Anthony A. Laurentano, Esq.

(57) ABSTRACT

A fuel cell system includes a fuel cell stack for power generation by electrochemical reactions of a fuel gas and an oxygen-containing gas, a high voltage energy storage capable of storing and discharging electrical energy generated by power generation of the fuel cell stack, and capable of being directly coupled to the fuel cell stack, a group of loads consuming at least electrical energy generated by the fuel cell stack or electrical energy discharged from the high voltage energy storage, and an auxiliary device control unit for reducing an amount of electrical energy remaining in the energy storage to a predetermined value by any of the group of loads, before starting power generation of the fuel cell stack.

8 Claims, 8 Drawing Sheets

U.S. PATENT DOCUMENTS

| | | | |
|---|---|---|---|
| 2004/0219409 A1* | 11/2004 | Isogai | 429/26 |
| 2004/0247962 A1* | 12/2004 | Toukura | 429/22 |
| 2005/0206342 A1 | 9/2005 | Aleyraz et al. | |
| 2006/0012340 A1* | 1/2006 | Saeki et al. | 320/132 |
| 2006/0040149 A1* | 2/2006 | Aso et al. | 429/13 |
| 2006/0088738 A1 | 4/2006 | Aso | |
| 2006/0272868 A1* | 12/2006 | Fuse et al. | 180/65.1 |
| 2007/0087232 A1 | 4/2007 | Robin et al. | |
| 2008/0248351 A1* | 10/2008 | Wake et al. | 429/24 |
| 2009/0068520 A1* | 3/2009 | Wake et al. | 429/26 |

FOREIGN PATENT DOCUMENTS

| | | |
|---|---|---|
| JP | 2003-257460 | 9/2003 |
| JP | 2004-146118 | 5/2004 |
| JP | 2004-152681 | 5/2004 |
| JP | 2004-281219 | 10/2004 |
| JP | 2004-342461 | 12/2004 |
| JP | 2005-348530 | 12/2005 |
| JP | 2006-114486 | 4/2006 |
| JP | 2006-333602 | 12/2006 |
| JP | 2006-344498 | 12/2006 |

OTHER PUBLICATIONS

European Office Action for Application No. 08009411.3, dated Oct. 29, 2008.

* cited by examiner

FUEL CELL SYSTEM AND METHOD OF STARTING OPERATION OF FUEL CELL SYSTEM HAVING AN ENERGY STORAGE BY REDUCING AN AMOUNT OF ELECTRICAL ENERGY IN THE ENERGY STORAGE PRIOR TO STARTING POWER GENERATION

BACKGROUND OF THE INVENTION

1. Field of the Invention

The present invention relates to a fuel cell system including a fuel cell, an energy storage, and a group of loads. The fuel cell performs power generation by electrochemical reactions of reactant gases. The energy storage is capable of storing and discharging electrical energy generated by the fuel cell, and capable of being directly coupled to the fuel cell. The group of loads consume at least electrical energy generated by the fuel cell or electrical energy discharged from the energy storage. Further, the present invention relates to a method of starting operation of the fuel cell system.

2. Description of the Related Art

The fuel cell is a system for obtaining direct current electrical energy by electrochemical reactions of a fuel gas (chiefly hydrogen-containing gas) supplied to an anode and an oxygen-containing gas supplied to a cathode.

For example, a polymer electrolyte fuel cell includes a power generation cell formed by sandwiching a membrane electrode assembly between separators. The membrane electrode assembly includes the anode, and the cathode, and an electrolyte membrane interposed between the anode and the cathode. The electrolyte membrane is a solid polymer ion exchange membrane. In use of this type of the power generation cell, generally, predetermined numbers of the membrane electrode assemblies and separators are alternately stacked together to form a fuel cell stack.

The fuel cell is promising in vehicle applications. For example, the fuel cell is mounted in a vehicle or the like. In the vehicle applications, power generation efficiency is high, and the exhaust gas is clean advantageously.

In the fuel cell vehicle, a hybrid power supply system has been adopted. In the hybrid power supply system, in order to assist the output responsiveness or the like of the fuel cell, an energy storage such as a battery or a capacitor (electric double layer capacitor) is used in combination with the fuel cell. In this case, at the time of starting operation of the system, if the fuel cell is operated at a low temperature, power generation of the fuel cell may not be performed efficiently.

In this regard, for example, a fuel cell system disclosed in Japanese Laid-Open Patent Publication No. 2004-281219 includes a fuel cell for performing power generation using a fuel gas and an oxygen-containing gas supplied to the fuel cell, oxygen-containing gas supplying means for supplying the oxygen-containing gas to the fuel cell, a fuel gas supplying means for supplying the fuel gas to the fuel cell, a secondary battery for storing and discharging electrical energy, electrical energy distribution means for supplying electrical energy generated by the fuel cell to auxiliary devices required for power generation of the fuel cell to consume the electrical energy by the auxiliary devices, supplying the electrical energy to the secondary battery for charging the secondary battery, and discharging the secondary battery to supply the discharged electrical energy to the auxiliary devices. Further, the fuel cell system includes control means for warming up the fuel cell and the secondary battery by repeating the step of controlling the electrical energy distribution means to supply electrical energy generated by the fuel cell to the auxiliary devices and the secondary battery at the time of starting operation of the system, and the step of controlling the electrical power distribution means to supply the electrical energy generated by the fuel cell and the electrical energy discharged from the secondary battery to the auxiliary devices.

According to the disclosure, at the time of starting operation of the system, it is possible to stabilize the fuel cell and raise the temperature of the fuel cell by self-heating. Also, it is possible to repeat charging and discharging the secondary battery and raise the temperature of the secondary battery by self-power generation. Therefore, the fuel cell and the secondary battery are effectively warmed up in a short period of time.

In general, in the system, in a state where the output voltage of the fuel cell is equal to the terminal voltage of the battery (the fuel cell is directly coupled to the battery), it is no longer possible to further decrease the output voltage of the fuel cell from this state. Therefore, it is not possible to collect electrical current from the fuel cell.

The energy storage such as a battery or a capacitor has characteristics in which as increase in the amount of charged electrical energy, the terminal voltage of the energy storage becomes high. In the fuel cell, the current-voltage characteristics (I-V characteristics) change depending on the temperature. In particular, at the time of starting operation of the fuel cell at a temperature below the freezing point, the I-V characteristics are significantly poor.

Figure 8:
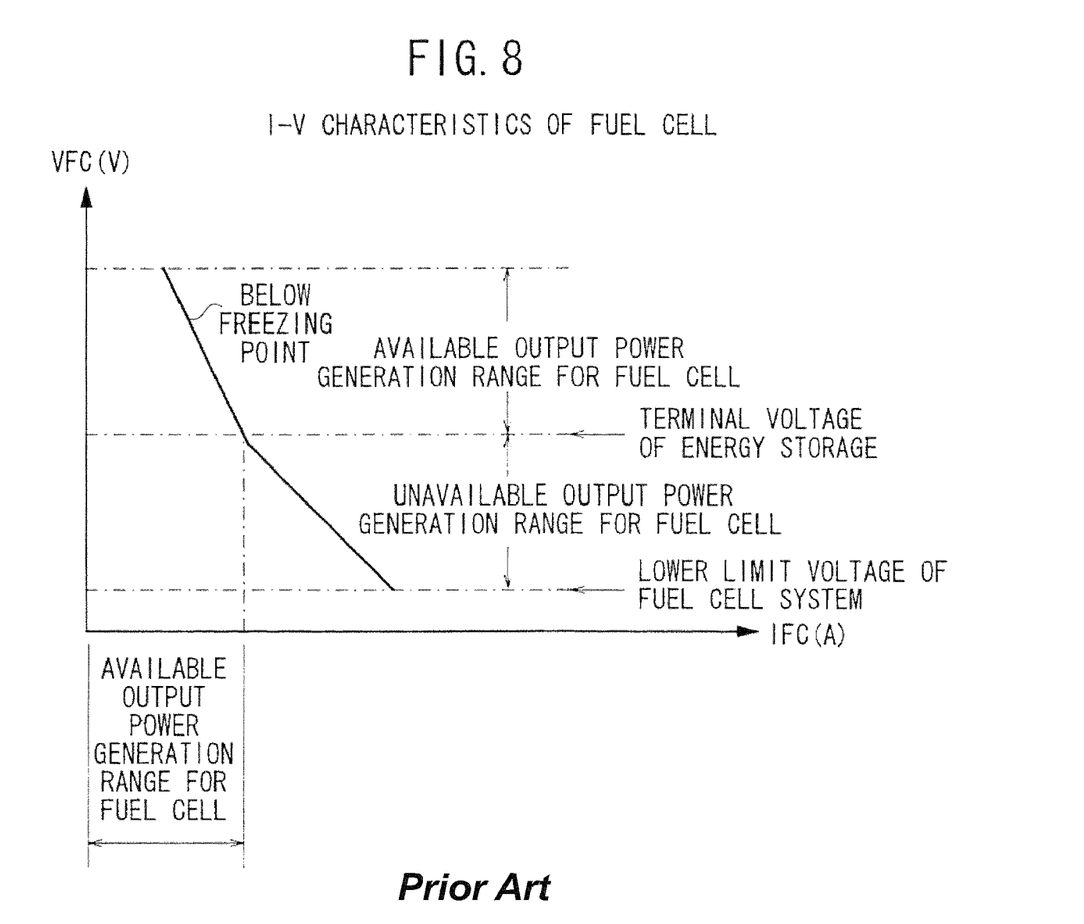
FIG. 8 is a graph showing I-V characteristics of a normal fuel cell.

Thus, as shown in FIG. 8, at the time of starting operation of the fuel cell at a temperature below the freezing point, the available output power generation range is very small. After collecting only a small amount of electrical current from the fuel cell, the potential of the output voltage of the fuel cell becomes equal to the potential of the terminal voltage of the energy storage. Thus, only small current can be collected from the fuel cell. Self-heating of the fuel cell is not performed sufficiently, and continuous power generation cannot be performed suitably.

SUMMARY OF THE INVENTION

The present invention has been made to solve the above problems, and an object of the present invention is to provide a fuel cell system and a method of starting operation of the fuel cell system in which, at the time of starting operation of the fuel cell system at low temperature, self-heating of the fuel cell is achieved easily and reliably, and continuous power generation is performed suitably.

The present invention relates to a fuel cell system including a fuel cell, an energy storage, and a group of loads. The fuel cell performs power generation by electrochemical reactions of reactant gases. The energy storage is capable of storing and discharging electrical energy generated by the fuel cell, and capable of being directly coupled to the fuel cell. The group of loads consume at least electrical energy generated by the fuel cell or electrical energy discharged from the energy storage.

Further, the fuel cell system includes a remaining electrical energy amount reduction device for reducing an amount of electrical energy remaining in the energy storage to a predetermined value by any of the group of loads, before starting power generation of the fuel cell.

According to a method of starting the fuel cell system of the present invention, before starting power generation of the fuel cell, the amount of electrical energy remaining in the energy storage is reduced to a predetermined value by any of the group of loads, and then, operation of the fuel cell is started.

In the present invention, before starting power generation of the fuel cell, in order to reduce the amount of electrical energy remaining in the energy storage, the terminal voltage of the energy storage is decreased, and the available output power generation range of the fuel cell is expanded. Accordingly, it is possible to increase electrical current collected from the fuel cell. Further, in particular, at the time of starting operation at low temperature, self-heating of the fuel cell is achieved easily and reliably. Thus, it is possible to suitably warm up the fuel cell, and continuous power generation can be performed reliably.

The above and other objects, features and advantages of the present invention will become more apparent from the following description when taken in conjunction with the accompanying drawings in which preferred embodiments of the present invention are shown by way of illustrative example.

DESCRIPTION OF THE PREFERRED EMBODIMENTS

Figure 1:
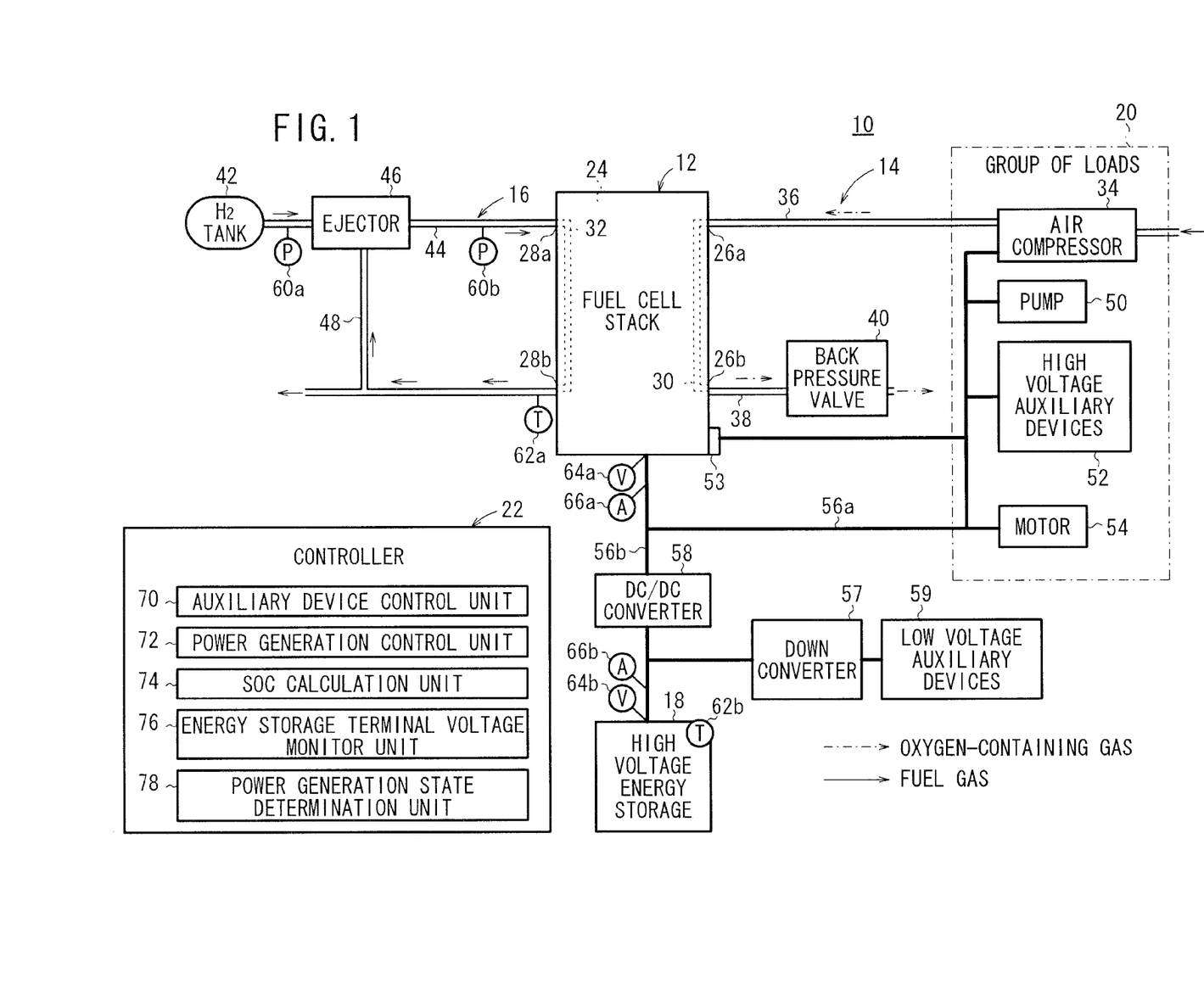
FIG. 1 is a diagram schematically showing structure of a fuel cell system mounted in a vehicle according to embodiments of the present invention.

As shown in FIG. 1, a fuel cell system 10 includes a fuel cell stack 12, an oxygen-containing gas supply apparatus 14 for supplying an oxygen-containing gas to the fuel cell stack 12, a fuel gas supply apparatus 16 for supplying a fuel gas to the fuel cell stack 12, and a coolant supply apparatus (not shown) for supplying a coolant to the fuel cell stack 12, and an energy storage, e.g., a high voltage energy storage 18 which is capable of storing and discharging electrical energy generated by power generation of the fuel cell stack 12 and being directly coupled to the fuel cell stack 12, a group of loads 20 which consume at least electrical energy generated by the fuel cell stack 12 or electrical energy discharged from the high voltage energy storage 18, and a control device (controller) 22 for implementing the overall control of the fuel cell system 10.

The fuel cell stack 12 is formed by stacking a plurality of fuel cells 24. Though not shown, each of the fuel cells 24 includes a membrane electrode assembly including an anode, a cathode, and a solid polymer electrolyte membrane interposed between the anode and the cathode. The membrane electrode assembly is sandwiched between a pair of separators.

At one end of the fuel cell stack 12 in the stacking direction, an oxygen-containing gas supply passage 26a for supplying an oxygen-containing gas such as the air and an oxygen-containing gas discharge passage 26b for discharging the oxygen-containing gas open. At the other end of the fuel cell stack 12 in the stacking direction, a fuel gas supply passage 28a for supplying the fuel gas such as a hydrogen-containing gas and a fuel gas discharge passage 28b for discharging the fuel gas open.

The oxygen-containing gas supply passage 26a and the oxygen-containing gas discharge passage 26b are connected to an oxygen-containing gas flow field 30 formed between the membrane electrode assembly of each fuel cell 24 and one of the separators sandwiching the membrane electrode assembly. The fuel gas supply passage 28a and the fuel gas discharge passage 28b are connected to a fuel gas flow field 32 formed between the membrane electrode assembly of each fuel cell 24 and the other of the separators sandwiching the membrane electrode assembly.

The oxygen-containing gas supply apparatus 14 includes an air compressor 34 for compressing the atmospheric air from the outside, and supplying the compressed air to the fuel cell stack 12. The air compressor 34 is provided in an air supply channel 36. The air supply channel 36 is connected to the oxygen-containing gas supply passage 26a of the fuel cell stack 12.

The oxygen-containing gas supply apparatus 14 includes an air discharge channel 38 which is connected to the oxygen-containing gas discharge passage 26b. A back pressure control valve 40 is provided in the air discharge channel 38 for regulating the pressure of the air supplied from the air compressor 34 to the fuel cell stack 12 through the air supply channel 36.

The fuel gas supply apparatus 16 includes a hydrogen tank 42 for storing a high pressure hydrogen (hydrogen-containing gas). The hydrogen tank 42 is connected to the fuel gas supply passage 28a of the fuel cell stack 12 through a hydrogen supply channel 44. An ejector 46 is provided in the hydrogen supply channel 44. The hydrogen gas is supplied from the hydrogen tank 42 to the ejector 46. The ejector 46 supplies the hydrogen gas to the fuel cell stack 12 through the hydrogen supply channel 44. Further, the ejector 46 sucks the exhaust gas containing the unconsumed hydrogen gas which has not been consumed in the fuel cell stack 12 such that the exhaust gas is discharged to a hydrogen circulation channel 48 connected to the fuel gas discharge passage 28b. The exhaust gas sucked by the ejector 46 is supplied again to the fuel cell stack 12.

The group of loads 20 include, in addition to the air compressor 34, a pump 50 of the coolant supply apparatus, high voltage auxiliary devices 52 including an air conditioner, a heater 53 for heating the fuel cell stack 12, and a motor 54 for traveling.

The fuel cell stack 12 and the group of loads 20 are connected through a first bus 56a. The high voltage energy storage 18 is connected to a position in the middle of the first bus 56a through a second bus 56b. Further, a DC-DC converter 58 as a boosting converter which can increase the voltage of the electrical energy discharged from the high voltage energy storage 18 is provided in the second bus 56b. For example, a capacitor such as an electric double layer capacitor or a battery is used as the high voltage energy storage 18. In the second bus 56b, a group of low voltage auxiliary devices 59 such as an audio device and a light are provided in a position between the high voltage energy storage 18 and a DC-DC converter 58 through a down-converter 57.

In the fuel gas supply apparatus 16, a first pressure sensor 60a is provided between the hydrogen tank 42 and the ejector 46, and a second pressure sensor 60b is provided between the ejector 46 and the fuel gas supply passage 28a of the fuel cell stack 12. In a hydrogen circulation channel 48, a first temperature sensor 62a is provided near the fuel gas discharge passage 28b.

In the first bus 56a, a first voltage sensor 64a and a first current sensor 66a are provided near the fuel cell stack 12. In the second bus 56b, a second current sensor 66b and a second voltage sensor 64b are provided near the high voltage energy storage 18. Further, a second temperature sensor 62b for detecting the temperature of the high voltage energy storage 18 is provided in the high voltage energy storage 18.

The control device 22 has functions of an auxiliary device control unit (remaining electrical energy amount reduction device) 70, a power generation control unit 72, a SOC calculation unit 74, an energy storage terminal voltage monitor unit 76, and a power generation state determination unit (power generation state determination device) 78. The auxiliary device control unit 70 is capable of decreasing the amount of remaining energy in the high voltage energy storage 18 to a predetermined value (described later) by any of the loads (described later). The power generation control unit 72 implements power generation control of the fuel cell stack 12. The SOC calculation unit 74 calculates the state of charge (SOC) in the high voltage energy storage 18. The energy storage terminal voltage monitor unit 76 monitors the terminal voltage of the high voltage energy storage 18. The power generation state determination unit 78 determines whether the fuel cell stack 12 performing power generation will be brought into a steady state or not based on whether operation of the fuel cell stack 12 is started at a temperature below the freezing point or not.

Figure 2:
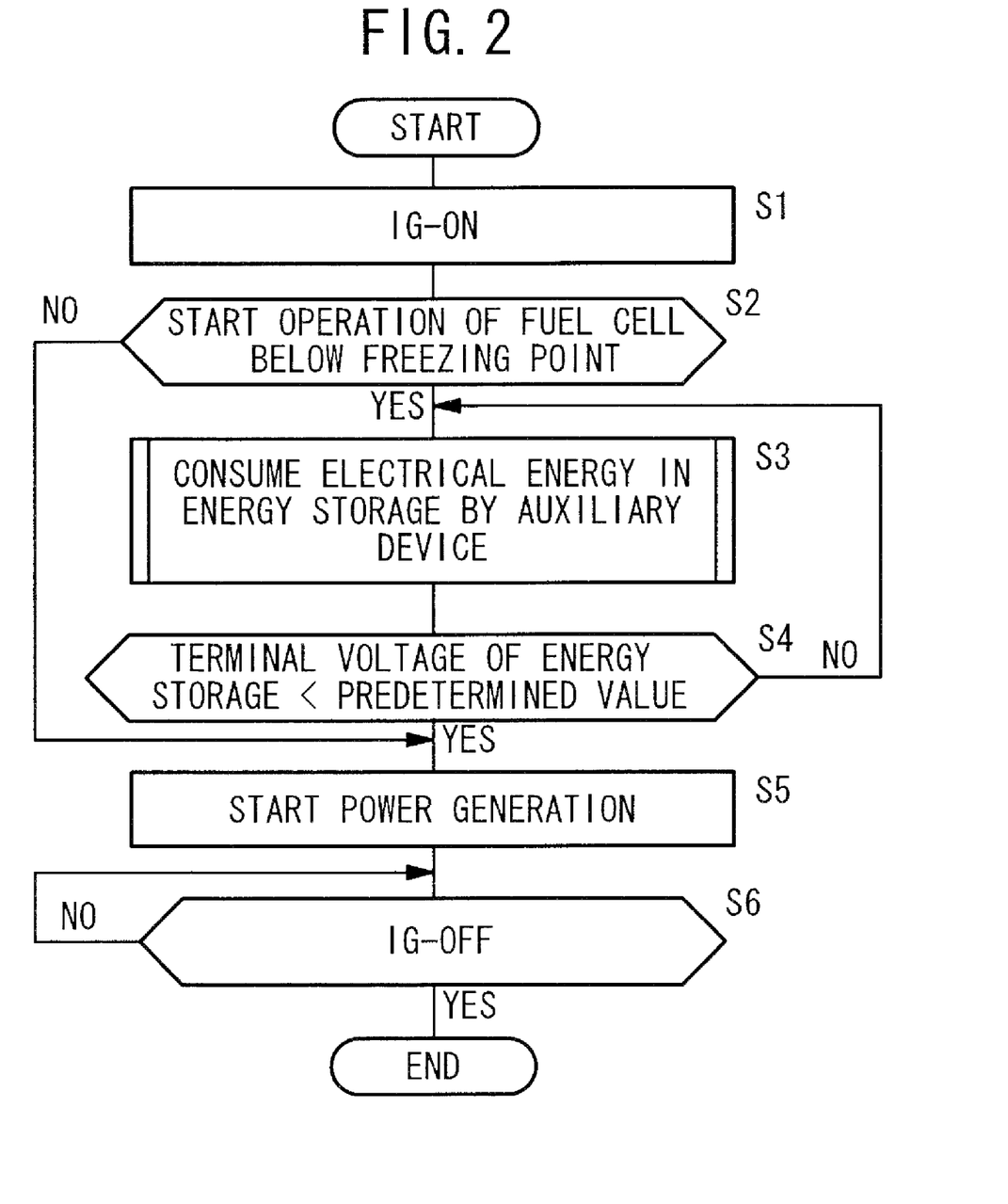
FIG. 2 is a flow chart showing a method of starting operation according to a first embodiment of the present invention.

Next, operation of the fuel cell system 10 will be descried in connection with a method of starting operation of a fuel cell system according to the first embodiment of the present invention with reference to a flow chart in FIG. 2.

Firstly, when an ignition (not shown) of the fuel cell system 10 is turned on, (step S1), the process proceeds to step S2, and the power generation state determination unit 78 determines whether operation of the fuel cell stack 12 is started at a temperature below the freezing point or not.

Figure 3:
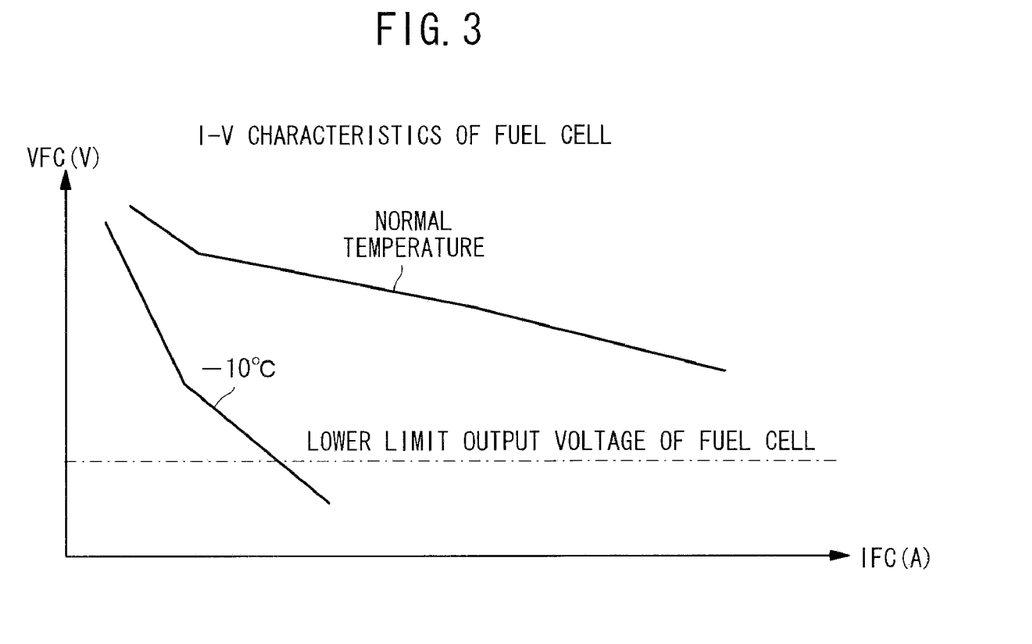
FIG. 3 is a graph showing I-V characteristics of a fuel cell depending on the change in the temperature.

As shown in FIG. 3, in comparison with the normal temperature, the I-V characteristics of the fuel cell 24 (current-voltage characteristic) are significantly poor at low temperature, in particular, below the freezing point. Thus, in step S2, if it is determined that operation of the fuel cell stack 12 is started at a temperature below the freezing point (YES in step S2), i.e., if it is determined that operation of the fuel cell stack 12 will not be brought into a steady state, the process proceeds to step S3 to consume electrical energy in the high voltage energy storage 18 by the loads.

Specifically, the auxiliary device control unit 70 supplies electrical current from the high voltage energy storage 18 to loads of the group of loads 20, i.e., to the auxiliary devices such as the air compressor 34 and the pump 50 for operation of the fuel cell stack 12. Therefore, the rotation number of the air compressor 34 is increased. The air is increased and provided under high pressure, and energy consumption in the high voltage energy storage 18 is performed.

Further, electric current from the high voltage energy storage 18 is supplied to the external loads of the high voltage auxiliary devices 52 separately from operation of the fuel cell stack 12, such as an air conditioner heater or a fan to consume electrical energy in the high voltage energy storage 18. Further, by supplying electrical current to the heater 53, electrical energy in the high voltage energy storage 18 is consumed, and it is possible to warm up the fuel cell stack 12.

Figure 4:
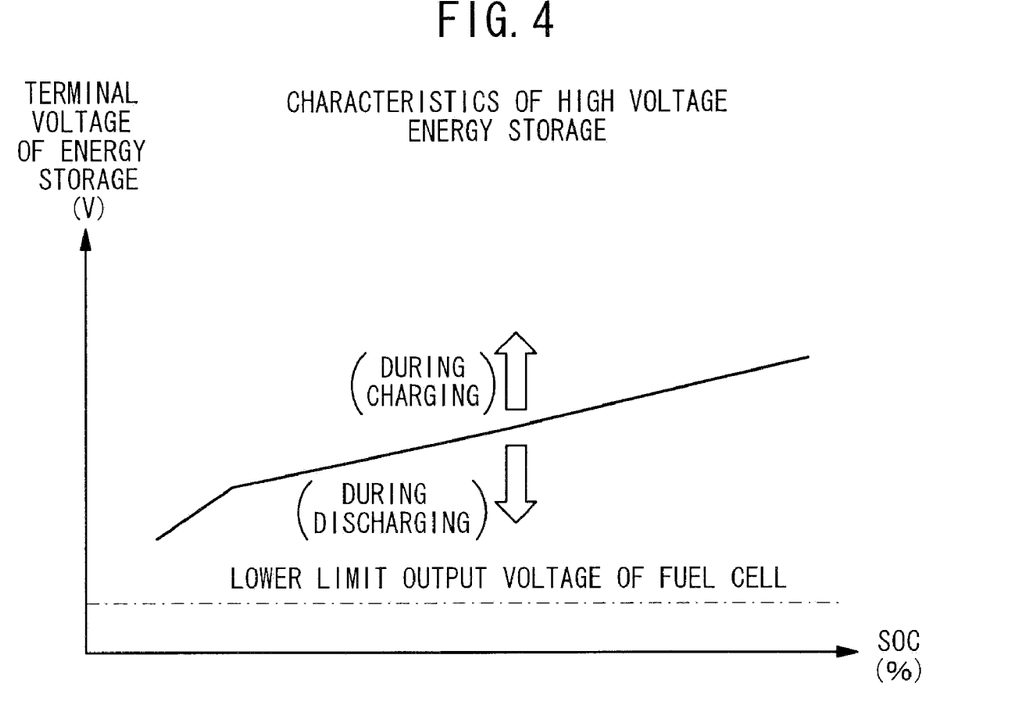
FIG. 4 is a graph showing characteristics of a high voltage energy storage.

In this case, as shown in FIG. 4, the terminal voltage of the high voltage energy storage 18 changes depending on the state of charge (SOC). As the decrease in the amount of electrical energy in the high voltage energy storage 18, the terminal voltage of the high voltage energy storage 18 is decreased. Thus, in step S3, when electrical energy in the high voltage energy storage 18 is consumed by the loads, the terminal voltage of the high voltage energy storage 18 is decreased.

As long as the electrical energy in the high voltage energy storage 18 is consumed by the load substantially before starting of the power operation of the fuel cell stack 12, the energy consumption may be performed before or after the supplying the fuel gas to the fuel cell stack 12, or may be performed before checking OCV (open circuit voltage).

A SOC calculation unit 74 calculates the amount of electrical energy (charging amount) remaining in the high voltage energy storage 18 by the second current sensor 66b and the second voltage sensor 64b. In step S4, an energy storage terminal voltage monitor unit 76 determines whether the terminal voltage of the high voltage energy storage 18 detected by the second voltage sensor 64b becomes a predetermined value or less.

The predetermined value is close to the lower limit voltage outputted from the fuel cell stack 12 in the atmosphere at the temperature at which the electrical energy in the high voltage energy storage 18 is consumed as described above. If it is determined that the detected terminal voltage of the high voltage energy storage 18 is the predetermined voltage or less (YES in step S4), the process proceeds to step S5 to start power generation of the fuel cell stack 12.

As shown in FIG. 1, in the oxygen-containing gas supply apparatus 14, the air compressor 34 is driven. The compressed air supplied from the air compressor 34 is supplied to the oxygen-containing gas supply passage 26a of the fuel cell stack 12 through the air supply channel 36. In the fuel gas supply apparatus 16, the hydrogen gas supplied from the hydrogen tank 42 is supplied to the fuel gas supply passage 28a of the fuel cell stack 12 through the ejector 46 and the hydrogen supply channel 44.

In each of the fuel cells 24 of the fuel cell stack 12, the air (oxygen-containing gas) supplied to the oxygen-containing gas supply passage 26a flows into the oxygen-containing gas flow field 30, and moves along the electrode surface of the cathode (not shown) for inducing an electrochemical reaction at the cathode. Then, the air is discharged into the oxygen-containing gas discharge passage 26b.

The hydrogen gas (fuel gas) supplied to the fuel gas supply passage 28a moves along the electrode surface of the anode (not shown) of each fuel cell 24 for inducing an electrochemical reaction at the anode, and thereafter the hydrogen gas is discharged into the fuel gas discharge passage 28b. Thus, in each of the fuel cells 24, by the electrochemical reactions of the oxygen in the air supplied to the cathode and the hydrogen supplied to the anode, power generation is performed.

The fuel gas discharge passage 28b of the fuel cell stack 12 is connected to the hydrogen circulation channel 48. Thus, the exhaust gas (exhaust fuel gas containing unconsumed hydrogen) discharged to the hydrogen circulation channel 48 returns to a position in the middle of the hydrogen supply channel 44 by sucking operation of the ejector 46, and then, the exhaust gas is supplied to the fuel cell stack 12 again as the fuel gas.

As described above, power generation is performed in each of the fuel cells 24, and the fuel cell stack 12 is warmed up by self-heating. By supplying electrical energy generated by power generation from the fuel cell stack 12 to the motor 54 through the first bus 56a, normal operation by the fuel cell system 10 is performed. Thereafter, in step S6, by turning off the ignition, the power generation process in the fuel cell system 10 is finished.

Figure 5:
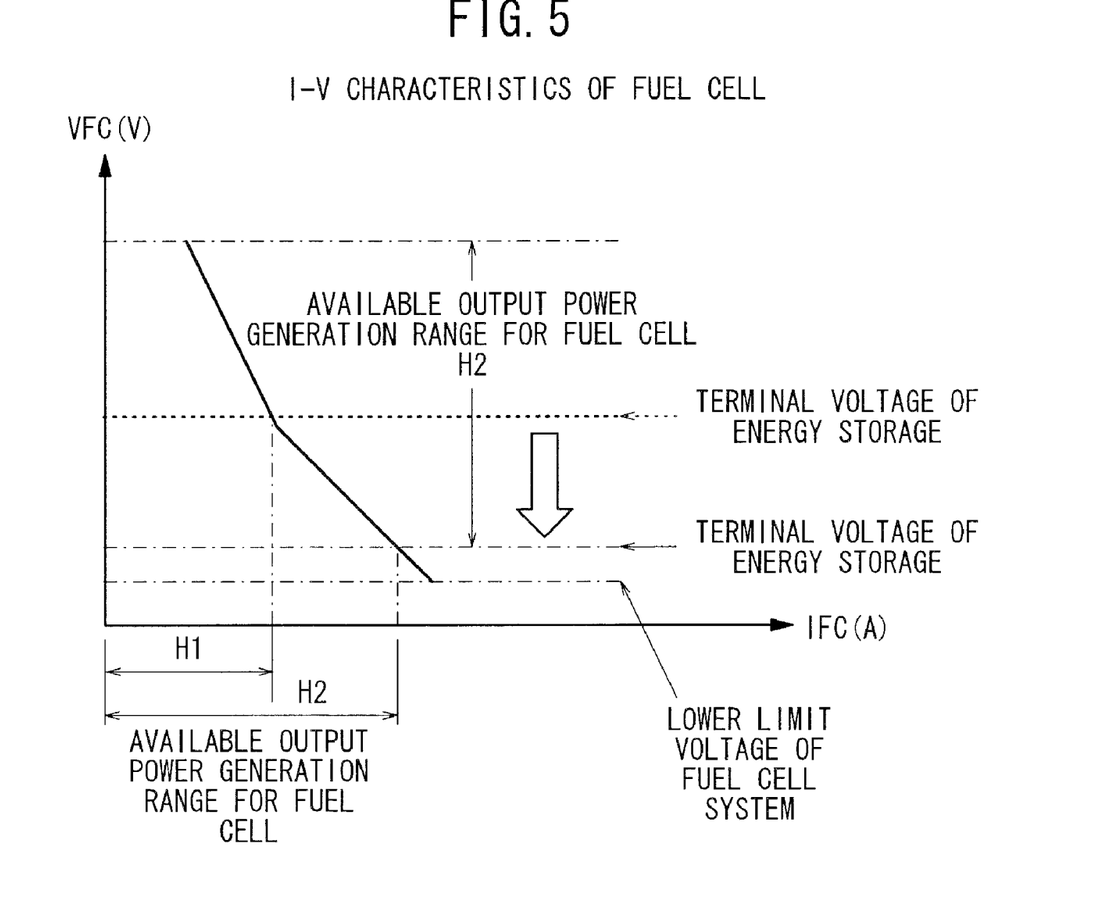
FIG. 5 is a graph showing I-V characteristics of a fuel cell when the terminal voltage of the high voltage energy storage is decreased.

In the first embodiment, before starting power generation of the fuel cell stack 12, the process of decreasing the terminal voltage of the high voltage energy storage 18, i.e., the process of consuming electrical energy in the high voltage energy storage 18 by the loads is performed. Thus, as shown in FIG. 5, the terminal voltage of the high voltage energy storage 18 is decreased to a value close to the lower limit voltage of the fuel cell system 10. Thus, the range H1 of available power generation output of the fuel cell stack 12 is expanded to the range H2 of the available power generation output.

Thus, the range of direct coupling between the fuel cell stack 12 and the high voltage energy storage 18 is sufficiently expanded, and it is possible to effectively increase the electrical current collected from the fuel cell stack 12. Thus, in particular, at the time of starting operation of the fuel cell stack 12 at low temperature, it is possible to reliably and easily induce self-heating of the fuel cell stack 12. The fuel cell stack 12 is warmed up suitably, and it becomes possible to carry out continuous power generation reliably.

Since the voltage of the DC-DC converter 58 can be boosted (increased), the predetermined voltage may be the lower limit voltage of the fuel cell system 10 as the guaranteed operating voltage for the down-converter 57 connected between the DC-DC converter 58 and the high voltage energy storage 18 or the low voltage auxiliary devices 59. The lower limit voltage of the fuel cell system 10 is lower than the lower limit output voltage of the fuel cell stack 12 (see FIG. 5).

Figure 6:
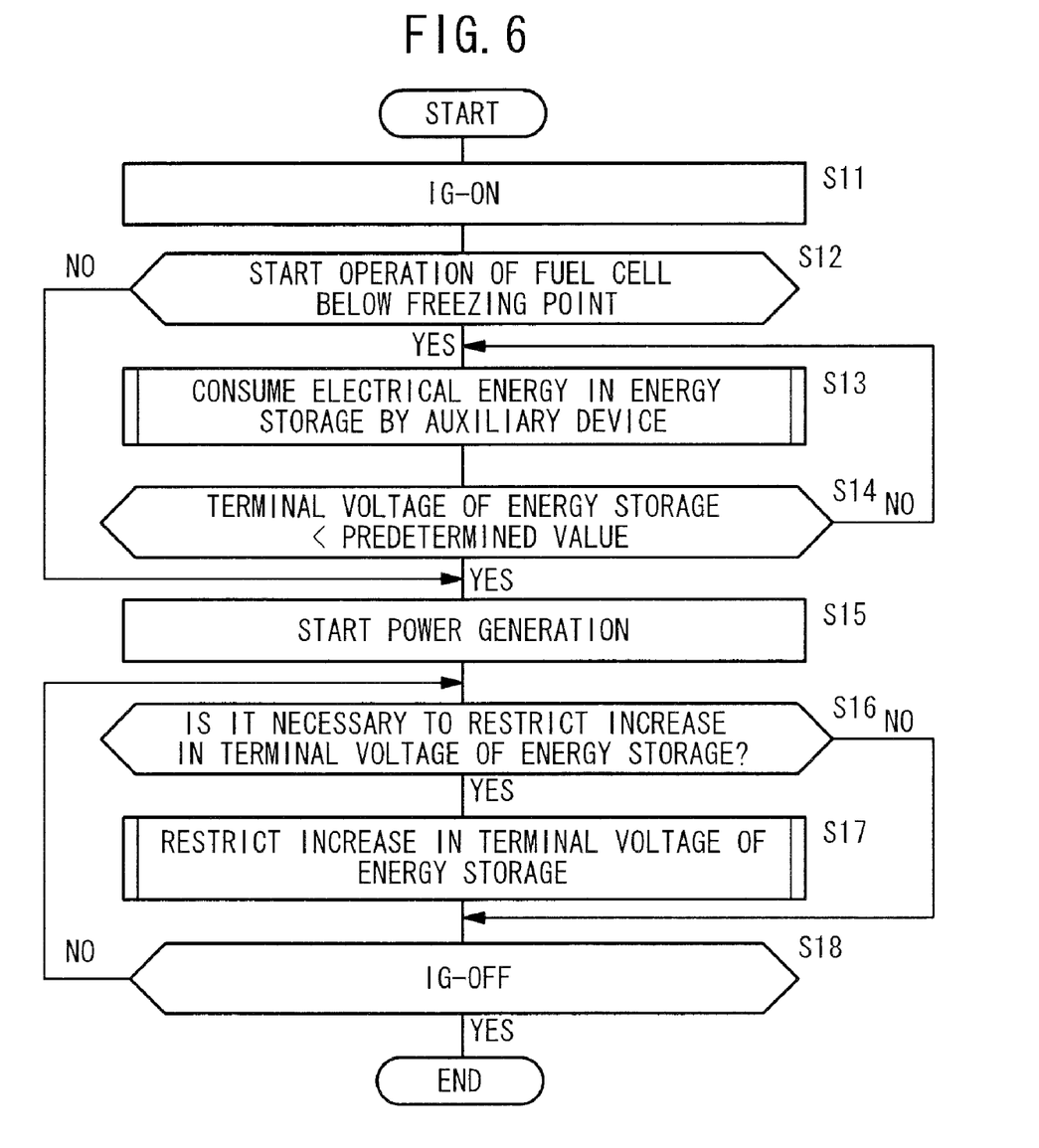
FIG. 6 is a flow chart showing a method of starting operation according to a second embodiment of the present invention.

Next, a method of starting operation of the fuel cell stack 12 according to a second embodiment will be described with reference to a flow chart in FIG. 6.

In the second embodiment, the control device 22 has functions of a warming up completion determining device for determining whether warming up of the high voltage energy storage 18 has been completed or not, and a voltage boosting restriction device for restricting increase in the voltage of the high voltage energy storage 18.

Firstly, after the ignition is turned on, processes before power generation of the fuel cell stack 12 is started (step S11 to step S15) are performed in the same manner as the steps S1 to S5 of the first embodiment.

Further, after power generation of the fuel cell stack 12 is started, the process proceeds to step S16 to determine whether it is necessary to restrict increase in the terminal voltage of the high voltage energy storage 18, e.g., based on whether warming up of the high voltage energy storage 18 has been completed or not.

As shown in FIG. 4, the high voltage energy storage 18 has characteristics in which as the increase in the charging amount, the terminal voltage of the high voltage energy storage 18 is increased. Further, while discharging electrical energy from the high voltage energy storage 18, the terminal voltage of the high voltage energy storage 18 is decreased temporarily, and while charging electrical energy in the high voltage energy storage 18, the terminal voltage of the high voltage energy voltage 18 is increased temporarily.

Figure 7:
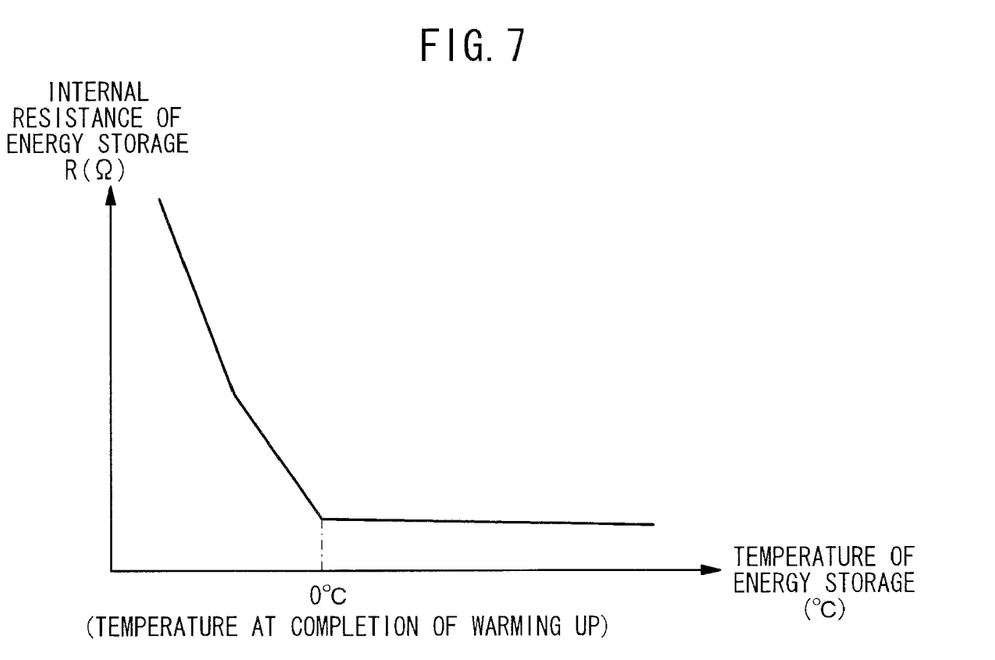
FIG. 7 is a graph showing the relationship between the internal resistance of the high voltage energy storage and the temperature of the high voltage energy storage.

As shown in FIG. 7, as the decrease in the temperature, specifically, as the decrease in the temperature below the freezing point, the internal resistance of the high voltage energy storage 18 tends to become significantly high. Therefore, when the atmosphere around the fuel cell stack 12 is at a temperature below the freezing point, i.e., before warming up of the high voltage energy storage 18, if charging of the high voltage energy storage 18 is performed, the terminal voltage of the energy storage 18 is temporarily increased to a significantly large value. Thus, it may not be possible to collect electrically current from the fuel cell stack 12.

Then, the warming up completion determination device (control device) 22 determines whether warming up of the high voltage energy storage 18 has been completed or not based on the detected temperature by the second temperature sensor 62b. If it is determined that warming up of the high voltage energy storage 18 has not yet been completed, it is required to restrict increase in the terminal voltage of the high voltage energy storage 18 (YES, in step S16), and the process proceeds to step S17 for performing the process of restricting increase in the terminal voltage of the energy storage 18. As the process of restricting the terminal voltage of the high voltage energy storage 18, for example, without charging electrical energy in the high voltage energy storage 18, increase in the terminal voltage of the high voltage energy storage 18 is prevented. Alternatively, by discharging electrical energy from the high voltage energy storage 18, the terminal voltage of the high voltage energy storage 18 is decreased.

It is necessary to control discharging of the high voltage energy storage 18 such that the terminal voltage of the high voltage energy storage 18 does not become the lower limit voltage of the fuel cell system 10 or less. By turning off the ignition (YES in step S18), warming up of the fuel cell system 10 is finished.

Thus, in the second embodiment, after starting power generation of the fuel cell stack 12, until completion of warming up of the high voltage energy storage 18, increase in the terminal voltage of the high voltage energy storage 18 is restricted. Thus, in the fuel cell stack 12, it is possible to collect electrical current even at low voltage. Accordingly, warming up of the fuel cell stack 12 is performed reliably, and power generation continues suitably.

In step S16, determination as to whether increase in the terminal voltage of the energy storage 18 needs to be restricted or not may be performed not only based on determination of whether warming up of the high voltage energy storage 18 has been completed or not, but also whether the system is under control for starting operation at a temperature below the freezing point, the output voltage of the fuel cell stack 12 is equal to the terminal voltage of the high voltage energy storage 18, i.e., the system is in the direct coupling state, and whether the I-V characteristics of the fuel cell stack 12 are poor or not.

In the first and second embodiments, whether the process proceeds to the step of consuming electrical energy in the high voltage energy storage 18 by the loads is determined based on whether operation of the fuel cell stack 12 is started at a temperature below the freezing point or not. Alternatively, the determination may be made based on whether the I-V characteristics of the fuel cell stack 12 are poor or not. At this time, the I-V characteristics during the previous power generation are used to determine whether the present I-V characteristics are poor or not.

While the invention has been particularly shown and described with reference to preferred embodiments, it will be understood that variations and modifications can be effected thereto by those skilled in the art without departing from the spirit and scope of the invention as defined by the appended claims.

What is claimed is:

1. A fuel cell system comprising:
   a fuel cell for performing power generation by electrochemical reactions of reactant gases supplied to said fuel cell;

an energy storage capable of storing and discharging electrical energy generated by power generation of said fuel cell, and capable of being directly coupled to said fuel cell such that a terminal voltage of the energy storage is equal to an output voltage of the fuel cell;

a group of loads consuming at least electrical energy generated by said fuel cell or I electrical energy discharged from said energy storage;

a remaining electrical energy amount reduction device for reducing an amount of electrical energy remaining in said energy storage to a predetermined value by any of said group of loads to achieve a state in which at least the terminal voltage of said energy storage becomes equal to a lower limit output voltage of said fuel cell, before starting power generation of said fuel cell;

a power generation state determining device for determining before starting operation of said fuel cell that said fuel cell is not brought into a steady state if operation of said fuel cell is started at a temperature below a freezing point, wherein the fuel cell system is capable of collecting electrical current from the fuel cell until the output voltage of the fuel cell becomes equal to the terminal voltage of the energy storage, and wherein if it is determined that said fuel cell is not brought into the steady state, the electrical energy amount remaining in said energy storage is reduced by said remaining electrical energy amount reduction device.

2. A fuel cell system according to claim 1, further comprising;

a voltage boosting restriction device for restricting increase in voltage of said energy storage; and a warming up completion determination device for determining whether warming up of said energy storage has been completed or not, wherein said voltage boosting restriction device restricts an increase in voltage of said energy storage when said warming up completion determination device determines that warming up of said energy storage has not yet been completed.

3. A fuel cell system according to claim 2, wherein the voltage boosting restriction device restricts increases in voltage of the energy storage by not charging the electric energy in the energy storage.

4. A fuel cell system according to claim 2, wherein the voltage boosting restriction device restricts an increase in voltage of the energy storage by discharging electrical energy from the energy storage.

5. A method of starting operation of a fuel cell system comprising:

a fuel cell for performing power generation by electrochemical reactions of reactant gases supplied to said fuel cell;

an energy storage capable of storing and discharging electrical energy generated by power generation of said fuel cell, and capable of being directly coupled to said fuel cell such that a terminal voltage of the energy storage is equal to an output voltage of the fuel cell; and a group of loads consuming at least electrical energy generated by said fuel cell or electrical energy discharged from said energy storage, wherein the fuel cell system is capable of collecting electrical current from the fuel cell until the output voltage of the fuel cell becomes equal to the terminal voltage of the energy storage, the method comprising the steps of:

reducing an amount of electrical energy remaining in said energy storage to a predetermined value by any of said group of loads before starting power generation of said fuel cell;

determining that said fuel cell is not brought into a steady state if operation of said fuel cell is started at a temperature below the freezing point; and reducing an electrical energy amount remaining in said energy storage if it is determined that said fuel cell is not brought into the steady state, to achieve a state in which at least the terminal voltage of said energy storage becomes equal to a lower limit output voltage of said fuel cell; and thereafter, starting operation of said fuel cell.

6. A method of starting operation of said fuel cell system according to claim 5, further comprising the steps of:

restricting increase in voltage of said energy storage;

determining whether warming up of said energy storage has been completed or not; and restricting an increase in voltage of said energy storage when it is determined that warming up of said energy storage has not yet been completed.

7. A method of starting operation of said fuel cell system according to claim 6, wherein the increase in voltage of the energy storage is restricted by not charging the electric energy in the energy storage.

8. A method of starting operation of said fuel cell system according to claim 6, wherein the increase in voltage of the energy storage is restricted by discharging electrical energy from the energy storage.

* * * * *